US011230946B2

United States Patent
Davis et al.

(10) Patent No.: US 11,230,946 B2
(45) Date of Patent: Jan. 25, 2022

(54) NON-UNIFORM SPRAY PATTERN OIL DELIVERY NOZZLE

(71) Applicant: United Technologies Corporation, Farmington, CT (US)

(72) Inventors: Michael M. Davis, North Granby, CT (US); Colin D. Craig, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 344 days.

(21) Appl. No.: 16/269,637

(22) Filed: Feb. 7, 2019

(65) Prior Publication Data

US 2020/0256211 A1 Aug. 13, 2020

(51) Int. Cl.
*F01D 25/18* (2006.01)
*F01D 25/20* (2006.01)
*F02C 7/06* (2006.01)
*F01D 25/12* (2006.01)
*F01M 1/08* (2006.01)
*F16N 21/02* (2006.01)

(52) U.S. Cl.
CPC .......... *F01D 25/18* (2013.01); *F01D 25/125* (2013.01); *F01D 25/20* (2013.01); *F01M 1/08* (2013.01); *F02C 7/06* (2013.01); *F16N 21/02* (2013.01); *F05D 2250/14* (2013.01); *F16N 2210/02* (2013.01); *F16N 2210/08* (2013.01); *F16N 2210/14* (2013.01)

(58) Field of Classification Search
CPC ........ F01D 25/125; F01D 25/18; F16N 21/02; F16N 31/00; F01M 1/08; F05D 2250/14
See application file for complete search history.

(56) References Cited

U.S. PATENT DOCUMENTS

| 2,964,248 | A |   | 12/1960 | O'Brien et al. |
| 3,521,824 | A | * | 7/1970  | Wilcox ................. B05B 7/0861 239/424.5 |
| 3,622,080 | A |   | 11/1971 | Greenwood |
| 4,527,911 | A | * | 7/1985  | Davis ...................... F01D 25/18 384/471 |
| 4,648,485 | A | * | 3/1987  | Kovaleski ............... F01D 25/18 184/13.1 |

(Continued)

FOREIGN PATENT DOCUMENTS

| EP | 2154337 A2 | 2/2010 |
| GB | 1258762 A | 12/1971 |
| WO | 2015130425 A2 | 9/2015 |

OTHER PUBLICATIONS

European Search Report for European Application No. 20155910.1 dated Jun. 29, 2020.

*Primary Examiner* — Alain Chau
(74) *Attorney, Agent, or Firm* — Carlson, Gaskey & Olds, P.C.

(57) ABSTRACT

A gas turbine engine includes an engine static structure. A rotating structure is configured to rotate relative to the engine static structure. The rotating structure has a target area with first and second directions. The first direction is greater than the second direction. A lubrication system includes a nozzle having a non-circular exit aimed at the target area. The exit provides a width and a height. The width is greater than the height. The width is oriented in the first direction.

12 Claims, 3 Drawing Sheets

(56) References Cited

U.S. PATENT DOCUMENTS

| | | | |
|---|---|---|---|
| 4,856,273 A * | 8/1989 | Murray | F01D 25/18 |
| | | | 60/39.08 |
| 7,104,250 B1 | 9/2006 | Yi et al. | |
| 7,174,997 B2 * | 2/2007 | Sheridan | F16N 29/00 |
| | | | 184/6.26 |
| 7,418,940 B1 | 9/2008 | Yi et al. | |
| 10,041,410 B2 * | 8/2018 | Beier | F02C 3/04 |
| 10,385,710 B2 * | 8/2019 | Hendrickson | F01D 25/18 |
| 2003/0039421 A1 | 2/2003 | Fisher et al. | |
| 2010/0038173 A1 * | 2/2010 | Munson | F16N 7/16 |
| | | | 184/6.11 |
| 2016/0076449 A1 | 3/2016 | Beier | |
| 2018/0223682 A1 * | 8/2018 | Hendrickson | F01D 25/18 |

\* cited by examiner

NON-UNIFORM SPRAY PATTERN OIL DELIVERY NOZZLE

BACKGROUND

This disclosure relates to a lubrication system for a gas turbine engine.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A common gas turbine engine oil delivery scheme to an engine bearing compartment includes plumbing oil to a strut in the main center body. The oil is delivered through a nozzle supported by the static structure, delivering oil at pressure and speed to various components within the bearing compartment, such as seal plates, oil scoops, bearings, and other components.

The nozzles are a cast component with cored passages, or a machined component with cross-drilled passages. Caps may be installed at the end of the passage to provide the nozzle that directs oil onto the intended target area.

The holes in the nozzle are typically circular in cross-section and deliver oil at high volumes toward the target area. The oil capture efficiency is derived primarily by the amount of oil reaching the target area versus the total oil flow. Axial and radial oil scoops are two approaches used to increase the amount of oil reaching the target area. The efficiency of scoops can be limited by geometrical constrictions, thermal/mechanical deflections of the various parts during operation, or "brooming" of oil flow as it exits the nozzle, impinging on non-target areas.

SUMMARY

In one exemplary embodiment, a gas turbine engine includes an engine static structure. A rotating structure is configured to rotate relative to the engine static structure. The rotating structure has a target area with first and second directions. The first direction is greater than the second direction. A lubrication system includes a nozzle having a non-circular exit aimed at the target area. The exit provides a width and a height. The width is greater than the height. The width is oriented in the first direction.

In a further embodiment of the above, the rotating structure includes a shaft. A bearing supports the shaft for rotation relative to the engine static structure. The nozzle is arranged in a compartment with the bearing.

In a further embodiment of any of the above, the rotating structure includes a spacer abutting the bearing. The spacer provides the target area.

In a further embodiment of any of the above, the target area is provided by a window in the spacer to flow oil underneath a bearing raceway and to a cage and rolling elements of the bearing radially outward.

In a further embodiment of any of the above, the rotating structure includes a threaded fastener that provides the target area.

In a further embodiment of any of the above, the target area is provided by a scoop on the rotating structure. The scoop is configured to retain a lubricant sprayed by the nozzle.

In a further embodiment of any of the above, the lubrication system includes a spray bar terminating in the nozzle.

In a further embodiment of any of the above, the spray bar has multiple nozzles.

In a further embodiment of any of the above, the target area includes a scoop configured to retain lubricant during rotation of the rotating structure.

In a further embodiment of any of the above, the scoop includes at least one of a window and a flange.

In a further embodiment of any of the above, the gas turbine engine includes a reservoir configured to collect the lubricant and a pump that is configured to deliver the lubricant from the reservoir to the nozzle.

In a further embodiment of any of the above, the exit has an elliptical shape.

In a further embodiment of any of the above, the exit has a racetrack shape.

In a further embodiment of any of the above, the exit is configured to provide a flattened spray pattern.

A lubrication system includes a structure that provides a fluid passage terminating in a nozzle having an exit. The exit has a width and a height. The width is greater than the height. The exit is configured to spray a lubricant on a target area of a component.

In a further embodiment of any of the above, the lubrication system includes a reservoir that is configured to collect the lubricant. A pump is configured to deliver the lubricant from the reservoir to the nozzle.

In a further embodiment of any of the above, the exit has a non-circular shape.

In a further embodiment of any of the above, the exit has an elliptical shape.

In a further embodiment of any of the above, the exit has a racetrack shape.

In a further embodiment of any of the above, the exit is configured to provide a flattened spray pattern.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
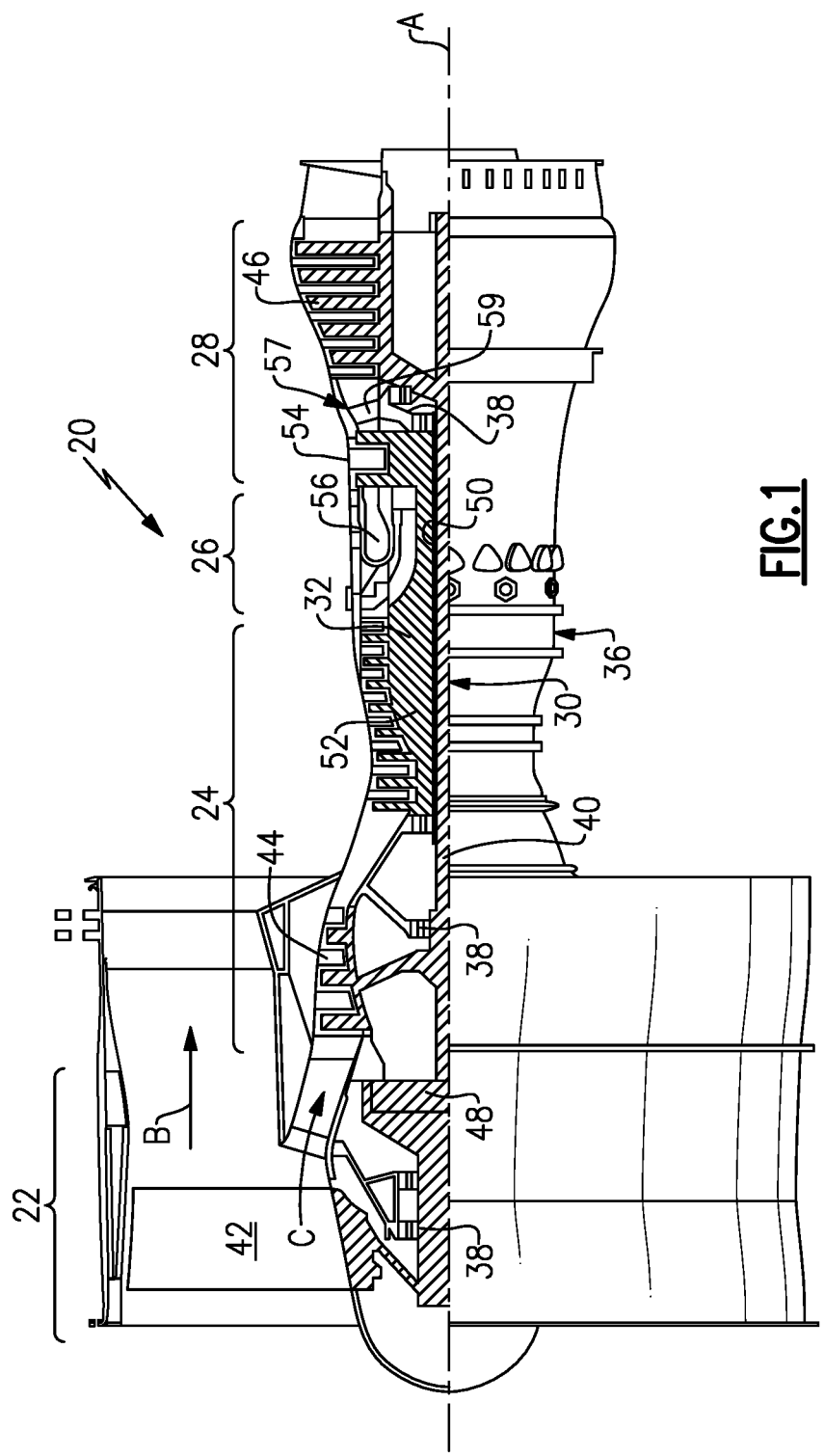
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
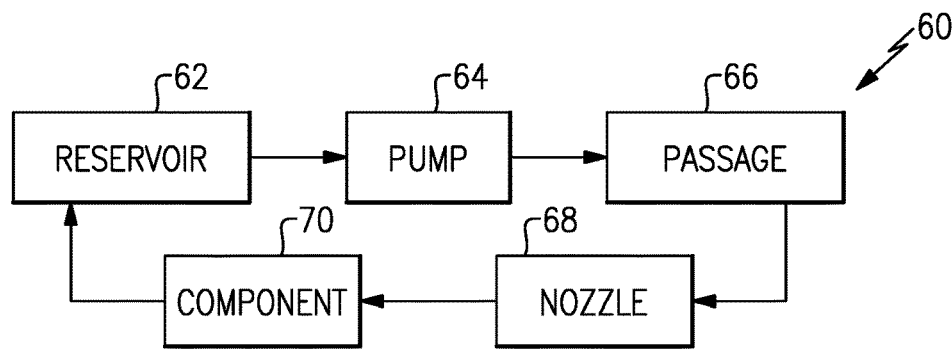
FIG. 2 is a schematic illustration of a lubrication system for the gas turbine engine shown in FIG. 1.

An oil lubrication system 60 is schematically illustrated in FIG. 2. The system 60 includes a reservoir 62 that holds a lubricant, such as oil, for various lubrication and cooling purposes within the engine 20. A pump 64 supplies oil from the reservoir 62 to a passage 66 that terminates in a nozzle 68. The nozzle 68 sprays oil onto one or more components 70 to cool and/or lubricate the component. Oil from the component 70 is returned to the reservoir 62 for reuse.

Figure 3:
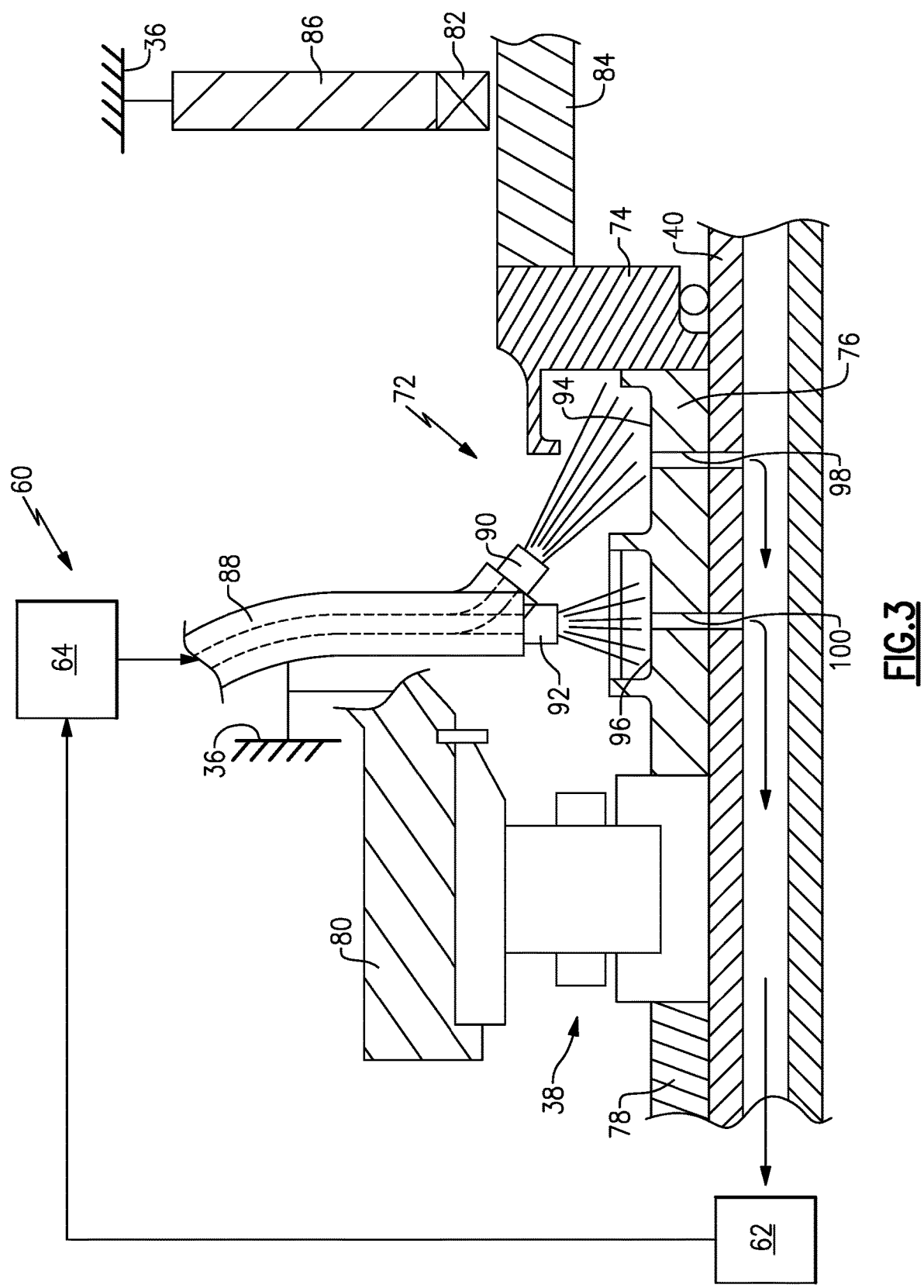
FIG. 3 is a partial cross-sectional view schematically depicting a portion of a bearing compartment.

An example bearing compartment is illustrated in FIG. 3. The bearing 38 supports a rotating structure 72, such as the inner shaft 40 for rotation with respect to the engine static structure 36. In the example, the bearing 38 is mounted between a support 80 and the inner shaft 40. A first threaded fastener 74 clamps a first wall 84. A spacer 76 is provided between the first threaded fastener 74 and the bearing 38. A second threaded fastener 78 clamps the bearing 38 against the spacer 76. An air seal 82 is provided between the first wall 84 and a second wall 86 that is supported by the inner static structure 36. It should be understood that the configuration illustrated in FIG. 3 is highly schematic, and variations are possible from the arrangement shown while still falling within the scope of the claims.

A spray bar 88, which received lubricant from pump 64, is supported with respect to the inner static structure 36. The spray bar 88 includes first and second nozzles 90, 92. Although two nozzles are shown, more or fewer nozzles may be provided by the same spray bar 88. The disclosed nozzle may be incorporated into other structures if desired.

In the disclosed example embodiment, the first and second nozzles 90, 92 are oriented to direct a spray of oil respectively onto first and second target areas 94, 96 provided by the first threaded fastener 74 and the spacer 76. Flow from the first and second target areas 94, 96 subsequently enter return passageways 98, 100, which are fluidly connected to the reservoir 62. In one example system, oil flowed to the radial windows flows towards the bearing 38 and flows centrifugally to feed the bearing 38 with oil. Oil runoff is then typically collected at a sump system at or near bottom dead center of the bearing compartment, then redirected to reservoir 62.

The first target area 94 on the first threaded fastener 74 is provided by a radially inwardly extending flange that provides a scoop to retain the lubricant during rotation. The second target area 96 on the spacer 76 is provided within a scoop created by a pair of spaced apart radially extending flanges arranged on either side of the window.

Figure 4:
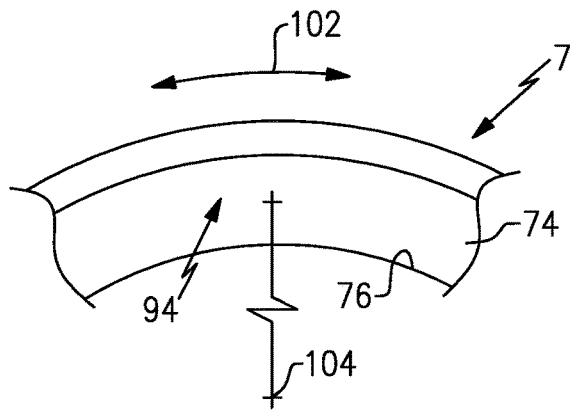
FIG. 4 schematically depicts a first target area in the bearing compartment.
Figure 5:
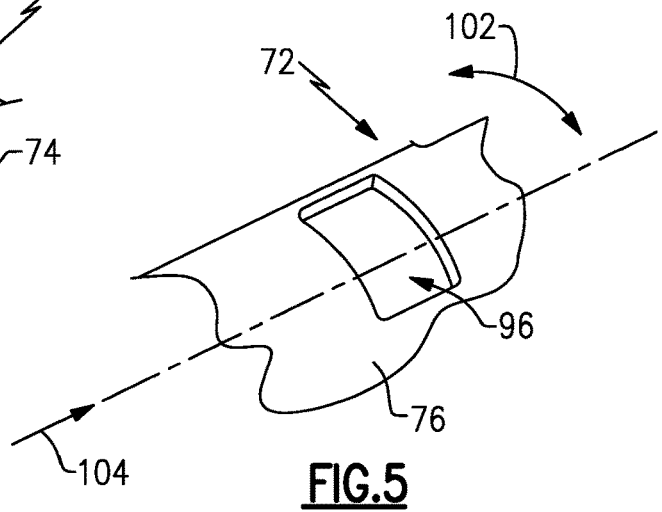
FIG. 5 schematically depicts a second target area in the bearing compartment.

Referring to FIGS. 3-5, the rotating structure 72 has first and second directions 102, 104 that respectively correspond to circumferential and axial directions. In the examples, the target areas 94, 96 are oriented such that the target area is larger in the first direction 102 than in the second direction 104. Thus, it may be desirable to provide a shaped oil spray such that more oil is provided from the nozzle in the first direction 102 than the second direction 104 to provide more efficient delivery of lubrication to the desired components. That is, the spray pattern is wider in the first direction 102 than in the second direction 104. In addition, it is also possible to design the nozzle 90 to spray in a pattern to avoid the radial lip of first threaded fastener 74 such that oil is not reflected off of the axial wall of the first threaded fasteners 74 by narrowing the brooming in the direction of the engine axis.

Figure 6A:
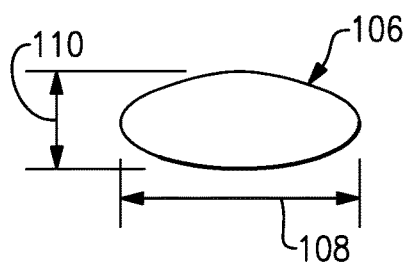
FIGS. 6A-6F illustrate example nozzle exit geometries.

In the disclosed design, each nozzle 90, 92 has an exit 106 (FIG. 6A) receiving oil from the passage 66. With reference to FIG. 6A, the exit 106 has a width 108 and a height 110, such that the width 108 is greater than the height 110. The width is oriented in the first direction 102 to deliver a wider spray pattern in the first direction 102 than in the second direction 104.

Figure 6B:
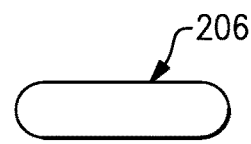
Figure 6C:
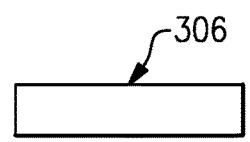
Figure 6D:
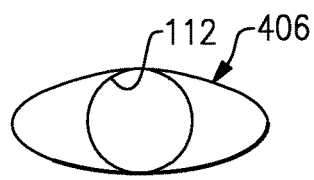
Figure 6E:
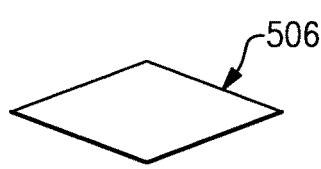
Figure 6F:
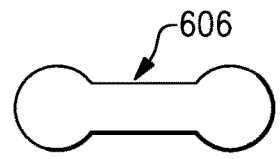

Various exit geometries are possible. Some exemplary geometries are illustrated in FIGS. 6A-6E. FIG. 6A illustrates a generally elliptical shape, while FIGS. 6B and 6F illustrate an exit 206, 606 with a shape having parallel sides adjoined by semicircles. Rectangular or diamond shaped exits 306, 506 are also possible, as shown in FIGS. 6C and 6E. Additionally, the exit 406 shown in FIG. 6D may include a non-circular geometry fed by a circular hole 112.

The disclosed nozzle and exit results in more efficient spray patterns, which reduces wear and maintenance. The spray pattern better reaches close-gapped target areas, allowing greater oil collection in the area. The passage and/or exit can be formed by casting, machining and/or additive manufacturing, for example.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the embodiments of the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
an engine static structure;
a rotating structure configured to rotate relative to the engine static structure, the rotating structure having a target area defined by first and second dimensions respectively arranged in first and second directions, the first dimension greater than the second dimension; and
a lubrication system including a nozzle having a non-circular exit aimed at the target area, the exit providing a width and a height, the width greater than the height, and the width oriented in the first direction, the exit configured to spray a lubricant directly onto the target area, wherein the target area is a window providing an opening in the rotating structure to flow oil underneath a bearing supporting the rotating structure for rotation relative to the engine static structure.

2. The gas turbine engine of claim 1, wherein the rotating structure includes a threaded fastener that provides a portion of the target area.

3. The gas turbine engine of claim 1, wherein the target area is provided by a scoop on the rotating structure, the scoop configured to retain a lubricant sprayed by the nozzle.

4. The gas turbine engine of claim 1, wherein the lubrication system includes a spray bar terminating in the nozzle.

5. The gas turbine engine of claim 4, wherein the spray bar has multiple nozzles.

6. The gas turbine engine of claim 1, wherein the target area includes a scoop configured to retain lubricant during rotation of the rotating structure.

7. The gas turbine engine of claim 6, wherein the scoop has a window bounded by a flange.

8. The gas turbine engine of claim 1, comprising a reservoir configured to collect the lubricant, and a pump configured to deliver the lubricant from the reservoir to the nozzle.

9. The gas turbine engine of claim 1, wherein the exit has an elliptical shape.

10. The gas turbine engine of claim 1, wherein the exit has a shape having parallel sides adjoined by semicircles.

11. The gas turbine engine of claim 1, wherein the exit is configured to provide a flattened spray pattern.

12. A gas turbine engine comprising:
an engine static structure;
a rotating structure configured to rotate relative to the engine static structure, the rotating structure having a target area defined by first and second dimensions respectively arranged in first and second directions, the first dimension greater than the second dimension, wherein the rotating structure includes a shaft, and a bearing supports the shaft for rotation relative to the engine static structure, wherein a nozzle is arranged in a compartment with the bearing, wherein the rotating structure includes a spacer abutting the bearing, the spacer provides the target area; and
a lubrication system including the nozzle, the nozzle having a non-circular exit aimed at the target area, the exit providing a width and a height, the width greater than the height, and the width oriented in the first direction, the exit configured to spray a lubricant directly onto the target area, wherein the target area is a window providing an opening in the spacer to flow oil underneath the bearing.

* * * * *